(12) United States Patent
Rajamony et al.

(10) Patent No.: US 7,082,514 B2
(45) Date of Patent: Jul. 25, 2006

(54) METHOD AND MEMORY CONTROLLER FOR ADAPTIVE ROW MANAGEMENT WITHIN A MEMORY SUBSYSTEM

(75) Inventors: Ramakrishnan Rajamony, Austin, TX (US); Hazim Shafi, Austin, TX (US); Robert B. Tremaine, Stormville, NY (US)

(73) Assignee: International Business Machines Corporation, Armonk, NY (US)

( * ) Notice: Subject to any disclaimer, the term of this patent is extended or adjusted under 35 U.S.C. 154(b) by 303 days.

(21) Appl. No.: 10/666,814

(22) Filed: Sep. 18, 2003

(65) Prior Publication Data

US 2005/0066113 A1    Mar. 24, 2005

(51) Int. Cl.
*G06F 12/00* (2006.01)

(52) U.S. Cl. ...................... 711/219; 711/169
(58) Field of Classification Search ............... None
See application file for complete search history.

(56) References Cited

U.S. PATENT DOCUMENTS

| | | | | |
|---|---|---|---|---|
| 5,506,810 A | * | 4/1996 | Runas ................. | 365/230.03 |
| 5,570,320 A | * | 10/1996 | Runas ................. | 365/230.03 |
| 5,581,513 A | * | 12/1996 | Mohan Rao ........... | 365/238.5 |
| 6,034,911 A | * | 3/2000 | Aimoto et al. ........ | 365/230.03 |
| 6,128,716 A | * | 10/2000 | Biggs ................. | 711/169 |
| 6,373,778 B1 | * | 4/2002 | Song et al. ........... | 365/230.04 |
| 6,556,952 B1 | | 4/2003 | Magro | |

* cited by examiner

*Primary Examiner*—Mano Padmanabhan
*Assistant Examiner*—Paul Baker
(74) *Attorney, Agent, or Firm*—Weiss, Moy & Harris, P.C.; Andrew M. Harris; Casimer K. Salys

(57) ABSTRACT

A method and memory controller for adaptive row management within a memory subsystem provides metrics for evaluating row access behavior and dynamically adjusting the row management policy of the memory subsystem in conformity with measured metrics to reduce the average latency of the memory subsystem. Counters provided within the memory controller track the number of consecutive row accesses and optionally the number of total accesses over a measurement interval. The number of counted consecutive row accesses can be used to control the closing of rows for subsequent accesses, reducing memory latency. The count may be validated using a second counter or storage for improved accuracy and alternatively the row close count may be set via program or logic control in conformity with a count of consecutive row hits in ratio with a total access count. The control of row closure may be performed by a mode selection between always closing a row (non-page mode) or always holding a row open (page mode) or by intelligently closing rows after a count interval (row hold count) determined from the consecutive row access measurements. The logic and counters may be incorporated within the memory controller or within the memory devices and the controller/memory devices may provide I/O ports or memory locations for reading the count values and/or setting a row management mode or row hold count.

20 Claims, 4 Drawing Sheets

METHOD AND MEMORY CONTROLLER FOR ADAPTIVE ROW MANAGEMENT WITHIN A MEMORY SUBSYSTEM

This invention was made with Government support under the NBCHC020056 awarded by DARPA. The Government has certain rights in this invention.

BACKGROUND OF THE INVENTION

1. Technical Field

The present invention relates generally to memory controllers, and more particularly, to a random access memory controller having an adaptive row management policy.

2. Description of the Related Art

Memory subsystems, such as those implemented in present-day computing systems, typically employ memory controllers that interface random-access memory (RAM—typically dynamic RAM or DRAM) to a processing unit and provide various other support functions such as refresh control, buffering (caching) and timing support. Present high-speed RAM implementations such as Synchronous DRAM (SDRAM), double data rate (DDR) SDRAM are in common use and quad data rate (DDRII) SDRAM is expected to be in common use within the near future.

A memory core is typically organized as a storage cell array having rows and columns. A row is accessed by providing a first selector (which is usually an "active" row select command in present SDRAM and DDR devices) and a row address that select data from all of the cells in the row onto internal column bitlines after pre-charging the column bitlines to a known state. A read or write command and column address then select the bitline that corresponds to the exact memory cell requested for a data read. Alternative RAM designs select all of the cells in a column to row bitlines and then select the individual row bitline to provide the data output, which is generally an equivalent circuit.

Memory controllers typically provide the row management policy for the memory subsystem. Typically the row management policy for present SDRAM designs is to hold the last accessed row open after the end of an access or to always close the current row after each access. SDRAM implementations that provide for burst count presetting improve performance for burst cycles, but not between individual accesses to the SDRAM (which may be bursts or single accesses). In order to terminate the row holding behavior of the SDRAM, a special command called a "precharge" command is issued to the SDRAM by a special combination of the command signal lines, which is typically only issued upon a row address change. Older memory configurations hold and terminate rows under control of a row address select (RAS) signal which may be held active during subsequent accesses to multiple columns within the same row.

Adaptive memory controllers, such as that described in U.S. Pat. No. 6,556,952, have been implemented that study bank miss and bank hit performance and provide for reconfiguration of bank size. However, such implementations require memory arrays that accommodate a programmable number of memory banks, which are typically limited between two page sizes. The above-referenced patent provides techniques for reconfiguring page size, refresh rates and write buffer parameters, but not the mode of the DRAM access and the DRAM performance measuring techniques discussed therein are not adapted for controlling row management policy as page misses are weighted more lightly than page hits.

It is therefore desirable to provide a method and apparatus for providing an adaptive row management policy within a memory controller, whereby average latency of the memory subsystem is reduced. It is further desirable to provide a method and apparatus for selecting a row management policy in a memory controller at system run-time in conformity with a measurement of row access behavior in the system.

SUMMARY OF THE INVENTION

The objective of reducing average memory subsystem latency by providing adaptive row management within a memory controller is provided in a method and apparatus. The memory controller includes a row hit counter that is provided to determine a number of consecutive accesses to a row and also includes control logic to selectively hold a row open after an access. The selection is made in conformity with a result of the row hit count determined by the row hit counter. Validation logic and counters may be used to further qualify an expected number of consecutive accesses for holding a row open. The counter(s) and logic may alternatively be incorporated within memory devices, so that row hold operations are performed automatically and independently for each device.

Alternatively to the above-mentioned consecutive access counting scheme, the row hit counter may be operated over a large number of accesses and the row hit counter output may be provided to an I/O port along with a total access count maintained within the memory controller, so that an average hit ratio can be determined externally and a count for controlling how many cycle a row is held open may be set by an external processor in conformity with the row hit counter output and total access count. Alternatively, a ratio circuit may be provided within a control logic of the memory controller and the page mode count set internally in conformity with a ratio of row hits to total accesses.

The foregoing and other objectives, features, and advantages of the invention will be apparent from the following, more particular, description of the preferred embodiment of the invention, as illustrated in the accompanying drawings.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

DESCRIPTION OF ILLUSTRATIVE EMBODIMENT

Figure 1:
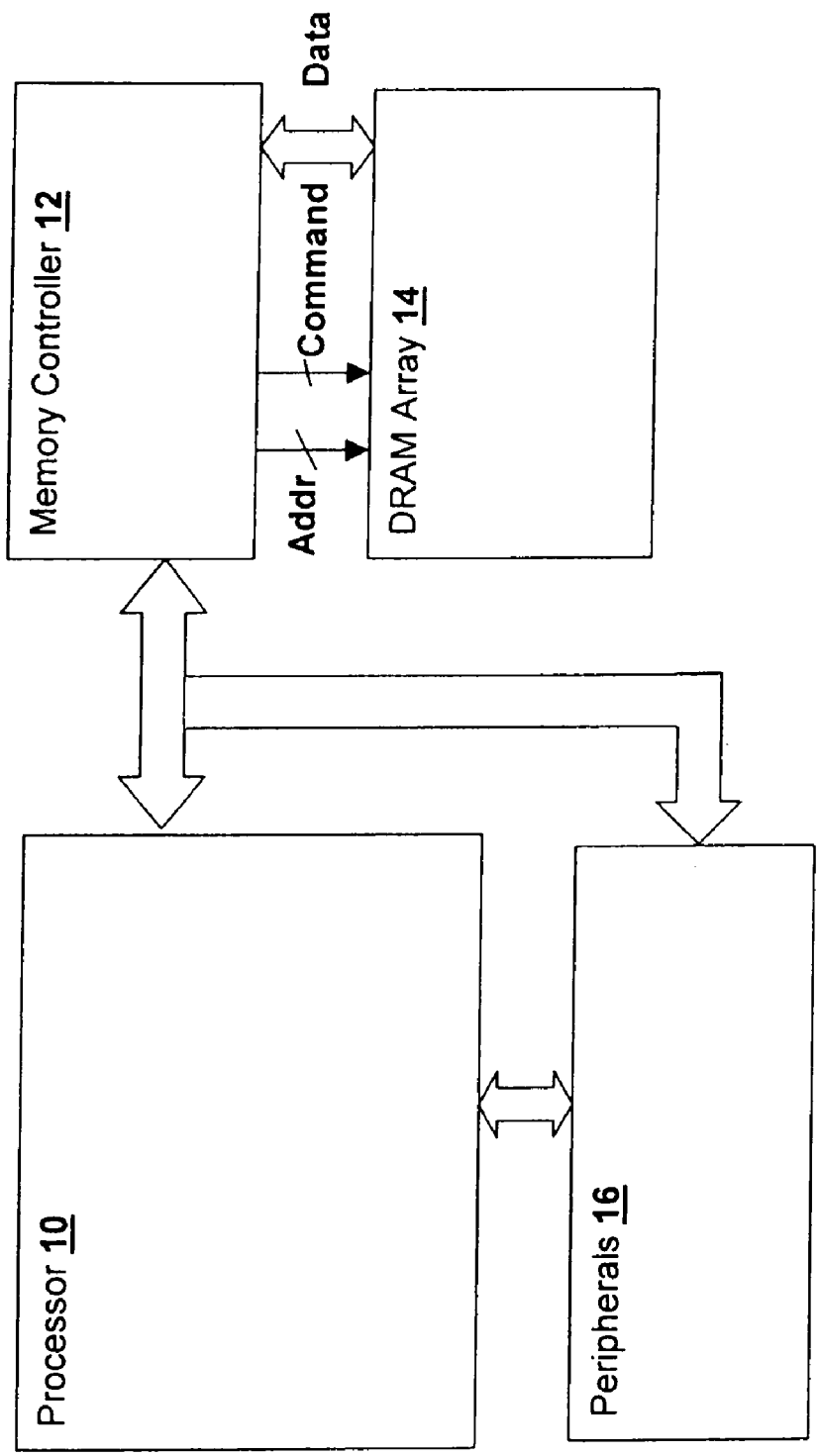
FIG. 1 is a block diagram of a computing system in accordance with an embodiment of the invention.

With reference now to the figures, and in particular with reference to FIG. 1, there is depicted a block diagram of a computer system including a memory controller 12 embodying a method and an apparatus in accordance with the present invention. Memory controller 12 is coupled to a DRAM array 14 and provides control signals in the form of address lines and command strobes. Memory controller 12 is also coupled to a processor 10 and peripherals 16 for storing and loading program instructions and data. While the illustrative embodiment depicts a memory controller adapted for controlling an SDRAM or DDR memory where commands are sent to precharge the memory array column bitlines and perform read/write and other operations, the present invention is also applicable to memories in which pages are selected by row address select (RAS) signals and it should be understood that memories in which a column address select signal (CAS) selects an active page are equivalent. When a read command is sent to DRAM array 14, fast access to data is available if the row address has not been changed since the last access. If the row address has changed, a precharge command must be issued and a wait time inserted before selecting a new row and sending a read command. The row-change access time is slower because the column bitlines must be precharged then the cells in the row enabled to force the bitlines to the state of the data stored in the selected row.

Two modes have been used in prior implementations of memory controllers: "page mode" and "non-page mode". If a memory controller is in "page mode", the row is held open (i.e., the cells in the selected row are enabled onto the column bitlines) and fast access is available as long as the row address does not change between accesses. If memory controller is not in page mode, then the last row is deselected after a data access is completed. The present invention includes new modes that hold a row open for a predetermined or dynamically determined row access count, as well as alternatively controlling traditional page mode selection in conformity with measured row hit performance.

Memory controller 12 includes mechanisms for providing adaptive row management policies, including mechanisms for providing metrics to processor 10 for selecting of a page mode under program control, mechanisms for internally selecting page mode in response to the measured metrics, and/or a page mode in which the row is held open for a number of accesses that is determined on-the-fly by counting actual accesses to rows of DRAM array 14.

Figure 2:
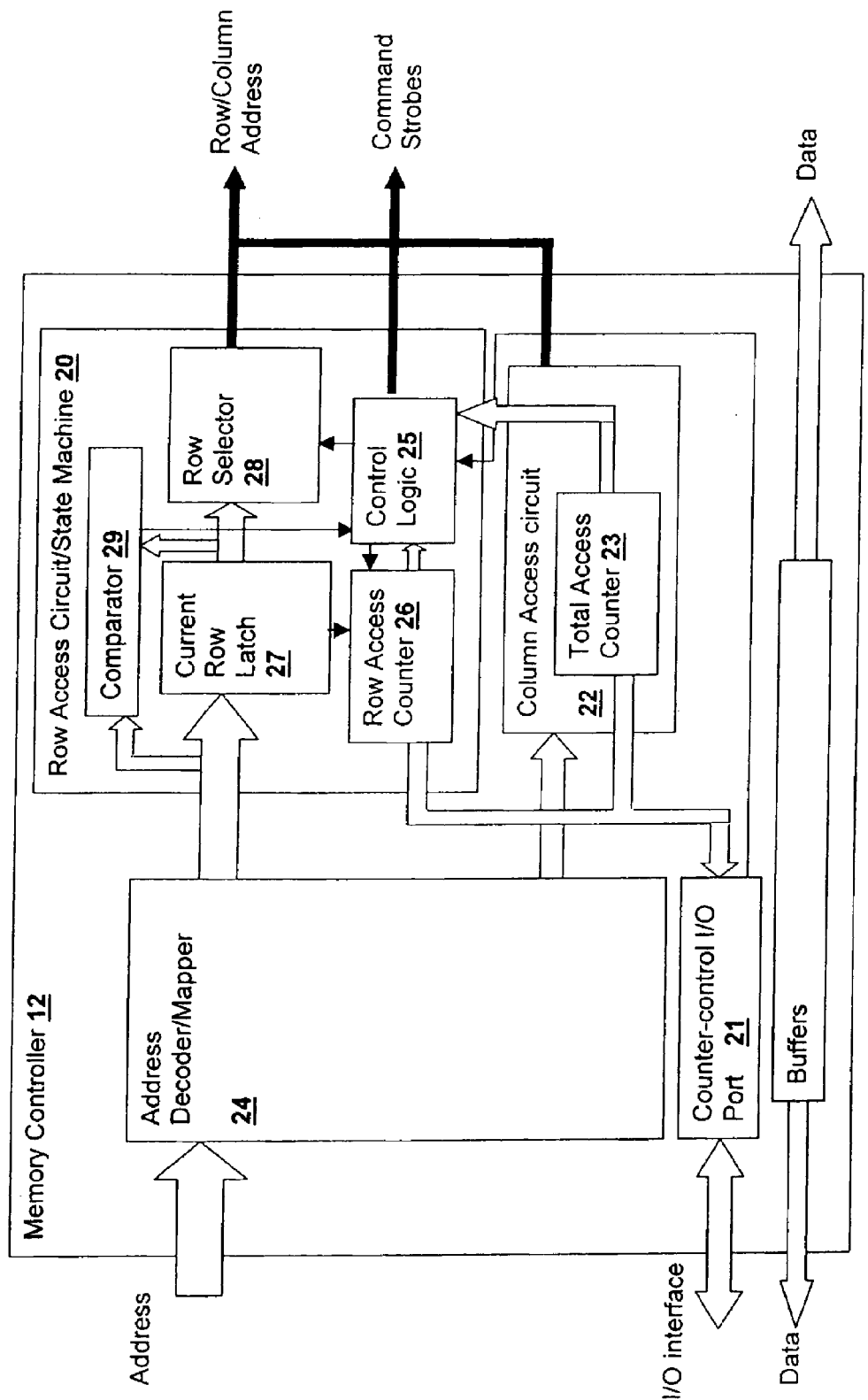
FIG. 2 is a block diagram depicting a memory controller in accordance with an embodiment of the present invention.

Referring now to FIG. 2, details of memory controller 12 are depicted in accordance with an embodiment of the present invention. FIG. 2 is also used generally to describe various embodiments of the present invention in the form of alternative operation of an internal control logic 25 and optionally including or deleting some of the functional blocks depicted, as will be described below.

Address signals are provided to an address decoder/mapper 24 from processor 10, peripherals 16 or generated internally in the case of refresh or cache control implementations. Address decoder/mapper 24 provides signals to a row access circuit 20 and a column access circuit 22 that provide the command strobes, as well as column/row address signals.

Row access circuit 20 is a state machine that controls the command strobe signals and provides row addresses, but will be described in the form of discrete functional blocks with control logic 25 for controlling the operation in accordance with the flow of a state machine in accordance with the present invention. It should be understood that sequential logical circuits can generally be built in a state machine form, or alternatively in discrete building blocks. A row access counter 26 tracks a number of consecutive row accesses to determine a metric that is used to determine a page mode operation of memory controller 12 via control logic 25. Control logic 25 may use the number of accesses to a previously-accessed row count to determine the number of subsequent accesses for which to hold a row open for a next-accessed row, but preferably, the count is validated by using multiple counters within row access counter 26 as will be described in further detail below. A current row latch 27 provides for comparison of a previously-accessed row address to a next-accessed row address via a comparator 29 that supplies a signal to control logic 25 indicating when the row address has changed from the prior row address for the previous access. When the address has changed, even if a row was scheduled to be held open due to page mode operation, a precharge command is sent to prepare DRAM array 14 for the next row access.

In conjunction with row access counter 26, comparator 29 and control logic 25 provide a mechanism for either sending the precharge command immediately after an access, or holding a row open until the next access to a different row address, or for a number of accesses determined by counters within row access counter 26. In general, for the "counted page mode" described above, row access counter 26 includes an up counter for determining a last row hit count and a down counter for counting down the last row hit count so that after the countdown has expired, control logic 25 will send the precharge command in anticipation of a row address change. In a preferred embodiment of the present invention, row access counter 26 includes a counter that is used to determine a first row hit count as well as to count the number of cycles to hold a row open. A second counter is used to count a second row hit count occurring after the first row hit count and if the counts match, the value is validated for use in holding rows open in subsequent accesses. Since the count of the two counters will be equal, the count information is retained for use in subsequent groups of row accesses by the second counter while the first counter counts down the validated number of accesses.

As an alternative to row access counter 26 determining the number of cycles to hold rows open, a counter I/O and control port 21 may be provided as part of the memory controller 12 status and control registers that provides a mechanism for reading a count of row access counter 26 and a count provided by a total access counter 23 within column access circuit 23. By reading the counter values, (which in the present embodiment may include counting over large numbers of access cycles in contrast to the above-described operation of row access counter 26 which will generally only count a small number of row accesses) processor 10 can determine the average row hit count, and program control logic 25 to hold rows open for that hit count. Alternatively, a ratio circuit may be implemented within control logic 25 to directly determine a row hit count from the counts provided by row access counter 26 and total access counter 23. Any of the above embodiments may be alternatively included within memory devices of DRAM array 14, providing transparent row management, but requiring duplication of the circuitry involved.

Figure 3:
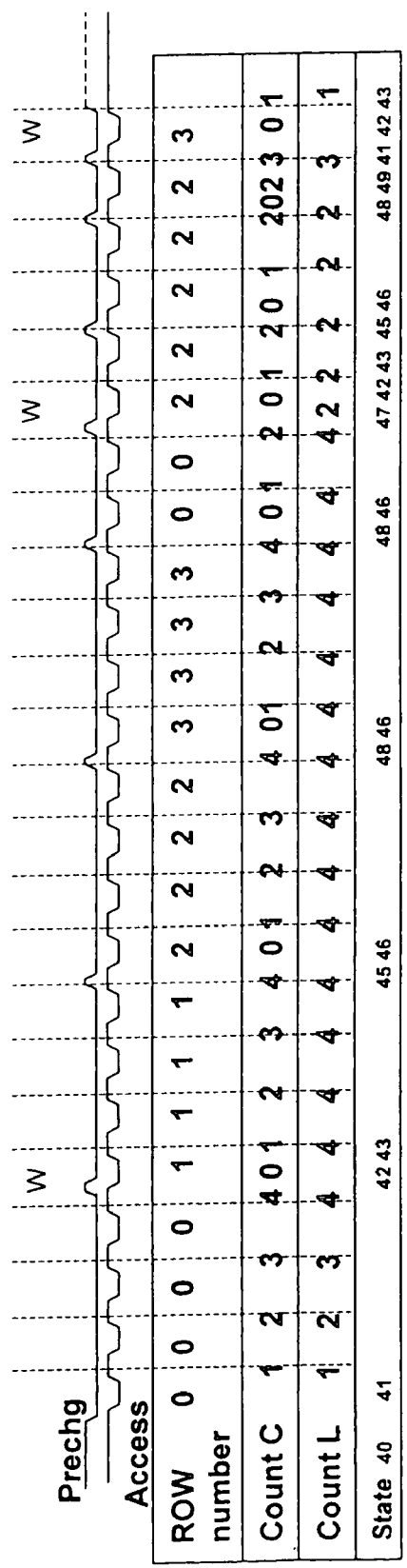
FIG. 3 is a timing diagram depicting signals within a memory controller in accordance with an embodiment of the present invention.

Referring now to FIG. 3, a timing diagram that illustrates operation of the validating count technique described above and in general illustrates row holding and "counting page mode" operation in accordance with the techniques of the present invention. An exemplary access signal (having a high-level logic state as depicted that corresponds to the command strobe combination for a read command) and precharge signal (having a high-level logic state as depicted that corresponds to the command strobe combination for a precharge command) are shown over a plurality of access cycles. A new row address is set after the precharge command is sent and prior to a read command. The ROW number is a number corresponding to a unique row address. Count C is the value of a counter that counts the first row hit count along with counter L and further controls the number of cycles for which the row is held open. Count L is the value of a second counter that tracks and retains the first row hit count until the count is validated or a row hit count change occurs. The state indicated at the bottom of the diagram is an indication of the state of a state machine within control logic 25 corresponding to the states depicted in FIG. 4 and will be discussed in more detail below.

The first group of accesses to ROW 0 consists of four consecutive accesses. Count C and L progress from 1 to 4 during the first group of accesses. The next group of accesses to ROW 1 also consists of four accesses and Count C progresses from 1 to 4 during the second group of accesses. Since the counts C and L match at the end of the second group of accesses, a row hit count of 4 is validated and a precharge command is sent at the end of the next groups of four accesses that are made to ROWS 2 and 3. The indication "W" at the top of the diagram indicates access cycles for which a wait must be inserted as the precharge is delivered late (due to an unexpected row change).

After the access to ROW 3, a group of two accesses is made to ROW 0. Count C has reached only a count of 2, but the count is aborted prematurely by the row address change and both counters are set to 2 in an attempt to validate the new count. The count of 2 is validated and an unneeded precharge is sent after two more accesses to row 2, but after another accesses to ROW 2 the undercount of the row hit count is discovered and count C is set to count L and the state machine attempts to "up" the row hit count to match the additional row hits. Note that in the diagram, the first two accesses to row 2 do not form part of the total count, as the count is not validated for the first two accesses. If the row hit count continues to be 5, then at the next validated undercount, the state machine will adjust.

Alternatively to the above operation, a non-validated scheme could use count C to count a number of row hits and count L could use the count obtained by count C to count down a number of cycles before issuing a precharge, but the validated technique described above is preferred. Other alternative embodiments include providing an output value via an I/O or memory mapped register within memory controller 12 (or a memory device if the apparatus of the present invention is incorporated therein). The output value may be provided by a simple counter or validated counter system as described above, or may include a first counter counting many row hits and a second counter counting total accesses. An external processor (or logic included within the counter apparatus) can determine a row hit count from a ratio of the row hit count to total access count and set a page mode count via an input register of memory controller 12 (or memory device if the apparatus is included therein).

Figure 4:
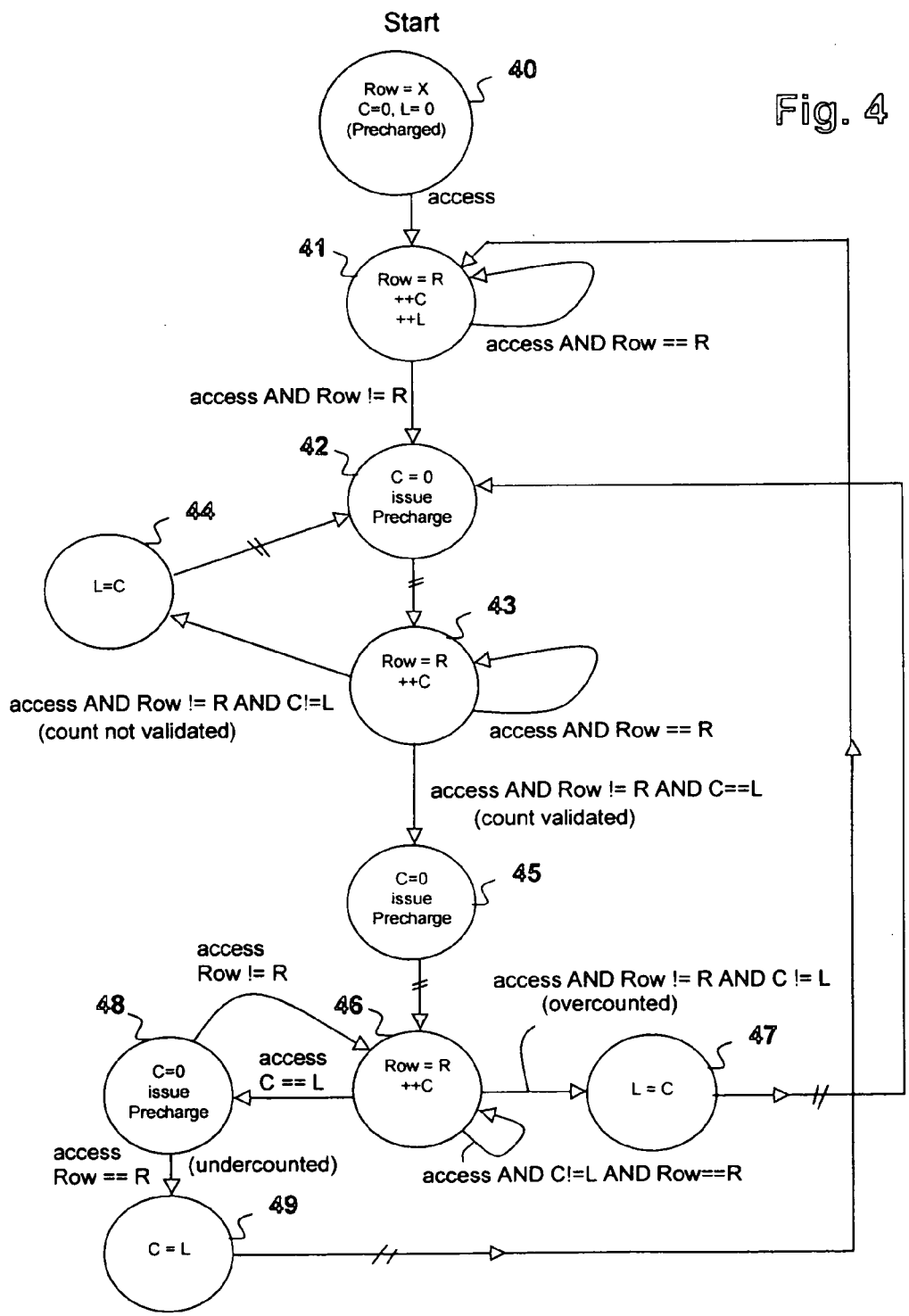
FIG. 4 is a state diagram depicting operation of a state machine in accordance with an embodiment of the present invention.

Referring now to FIG. 4, a state diagram for controlling the validating state machine described above is depicted. In the initial state (state 40), the row is invalid, the array is precharged and both counters are set to zero. Upon the first access to the memory array (state 41), the row is set and both counts are incremented. (In the diagram, a row update is indicated by ROW=R. In detail, both the ROW and row comparison value R are updated to a new row value in the indicated states.) Subsequent accesses to the same row cause the state machine to remain in state 41, where counts C and L are incremented to accumulate a first row hit count. When the row changes (state 42), count C is set to zero and a precharge is issued for access to the new row. The row address is set and count C is incremented (state 43). (Hash marks on connectors indicate unconditional transitions.) The state machine remains in state 43 until an access is made to a different row, meanwhile count C is incremented to accumulate the second row hit count. If an access is made to a different row before count C has reached the first row hit count stored in count L (state 44), the count is invalidated. Count L is set to count C. The state machine proceeds to state 42, where a precharge command is issued for access to the new row and the state machine commences an attempt to validate the most recent row hit count.

If an access is made in state 43 to a new row and count C has reached the value stored in count L, then the row hit count is validated, count C is set to zero and a precharge command is issued for access to the new row (state 45). The new row is set and count C is incremented (state 46). The state machine remains in state 46 until either the row changes or the count L value is reached by count C. If count C reaches the count L value, then a precharge is issued and count C is reset in expectation of a row change (state 48). If the row changes, then the state machine returns to state 46. For steady-state repetitive patterns, the state machine will operate between state 46 and state 48 once the count is validated.

From state 48, if the row does not change as expected, then count C is set to the count L value and the state machine returns to state 41 to attempt to increase the row hit count, as the lack of a row change indicates that the state machine has undercounted. From state 46, if the row changes and count C has not reached count L, then the state machine has over-counted, and count L is set to count C. The state machine then returns to state 42 in an attempt to validate the last (lowered) row hit count.

It should be noted that various blocks, such as counter-control I/O port 21 and total access counter 23 are not needed for the on-the-fly row hit counting state machine embodiment described above. Alternatively, for the I/O based implementation with large counters counting row hits and total accesses, control logic 25 may be simplified or may include a ratio computing circuit that determines a row hit value for loading into internal counters of control logic 25 that control the page mode count.

While the invention has been particularly shown and described with reference to the preferred embodiment thereof, it will be understood by those skilled in the art that the foregoing and other changes in form, and details may be made therein without departing from the spirit and scope of the invention.

What is claimed is:

1. A memory controller, comprising:
   an access control circuit for providing control signals to a memory, whereby rows of said memory are selected for access, and wherein said access control circuit has a selectable page mode for controlling a held-open state of a selected row within said memory after an access is complete; and
   a counter circuit coupled to said access control circuit for counting consecutive accesses to said selected row and further coupled to a control input of said access control circuit whereby said selectable page mode is set in conformity with a result of said counting, whereby an average latency of said memory is reduced.

2. The memory controller of claim 1, wherein said selectable page mode includes a page count mode for holding said selected row open for a number of accesses equal to a count value.

3. The memory controller of claim 2, wherein said counter circuit comprises a first counter for determining said count value by counting a number of consecutive accesses for which said selected row is selected, and a control logic for holding said selected row open for a number of accesses determined in conformity with said first number of consecutive accesses.

4. The memory controller of claim 3, wherein said counter circuit comprises a second counter for counting a next number of consecutive accesses for which another row is selected, subsequent to completion of said first counter counting a first group of consecutive accesses to said selected row.

5. The memory controller of claim 4, further comprising a comparison logic coupled to said first counter and said second counter for validating that said next number of consecutive accesses is equal to said first number of consecutive accesses.

6. The memory controller of claim 5, wherein said first counter, said second counter and said comparison logic form a state machine for controlling said number of accesses for which said row held open.

7. The memory controller of claim 2, further comprising a control register for setting said count value, whereby said counter circuit is programmed to count down a number of consecutive access cycles for which said row is held open.

8. The memory controller of claim 1, wherein said counter circuit comprises:
   a first counter coupled to said access control circuit for determining a number of consecutive accesses for which said selected row is selected and
   a second counter coupled to said access control circuit for counting a total number of accesses to said memory.

9. The memory controller of claim 8, wherein said counter circuit further comprises a ratio determining circuit coupled to said first counter and said second counter for determining a fraction of consecutive same-row accesses to total accesses, whereby said selectable page mode is set to optimize access time of said memory in conformity with said determined fraction.

10. The memory controller of claim 8, further comprising an output port selectable for reading under program control, wherein said output port provides access to a value of said counter circuit, whereby program instructions may read said value of said counter circuit.

11. The memory controller of claim 10, further comprising an input port selectable for writing under program control, whereby said selectable page mode may be set by a program instruction addressing said input port.

12. The memory controller of claim 1, wherein said access control circuit closes said row by issuing a precharge command in response to assertion of said control input by said counter circuit.

13. A memory device, comprising:
   a plurality of storage cells arranged by columns and rows;
   control logic for accessing one of said storage cells by precharging a plurality of column bitlines each coupled to a unique member of each row, selecting an entire row for output to said column bitlines, and selecting a column for output, wherein said control logic includes a selectable page mode for selectively disabling said row and precharging said column bitlines in anticipation of access to another row; and
   a counter circuit coupled to said control logic for counting consecutive accesses to said selected row and further coupled to a control input of said control logic, wherein said selectable page mode is set in conformity with a result of said counting, whereby an average latency of said memory device is reduced.

14. The memory device of claim 13, wherein said selectable page mode includes a page count mode for holding said selected row open for a number of accesses equal to a count value.

15. A method of managing reads in a memory array, comprising:
   first counting a number of consecutive row accesses to a first row of said memory array; and
   in conformity with a result of said counting, selecting a page mode of said memory array, wherein a last-accessed row of said memory is held open subsequent to accesses to said row, whereby an average latency of said memory array is reduced.

16. The method of claim 15, wherein said selecting further sets a count of said page mode, and wherein said method further comprises second counting consecutive accesses to a second row of said memory array and wherein said last-accessed row is held open only while a second count of said second counting is less than said count of said page mode.

17. The method of claim 16, further comprising:
   third counting consecutive accesses to another row of said memory array, subsequent to said first counting;
   comparing a third count of said third counting to a first count of said first counting; and
   in response to said comparing determining that said first count and said third count are equal, setting said count of said page mode to said first count.

18. The method of claim 15, wherein said first counting totals a number of consecutive accesses for all rows during an interval, and wherein said method further comprises:
   second counting a total number of accesses to said memory array during said interval; and
   computing a ratio of said first counting to said second counting, and wherein said page mode is selected in conformity with a result of said computing.

19. The method of claim 18, further comprising comparing said ratio to a predetermined threshold for selecting said page mode if said ratio exceeds said predetermined threshold.

20. The method of claim 18, wherein said selecting further sets a count of said page mode, and wherein said method further comprises second counting consecutive accesses to a second row of said memory array and wherein said last-accessed row is held open only while a second count of said second counting is less than said count of said page mode, and wherein said count of said page mode is set in conformity with said computed ratio.

* * * * *